United States Patent
Abe et al.

(10) Patent No.: US 10,821,663 B2
(45) Date of Patent: Nov. 3, 2020

(54) METHOD FOR MANUFACTURING THREE-DIMENSIONAL SHAPED OBJECT

(71) Applicant: PANASONIC INTELLECTUAL PROPERTY MANAGEMENT CO., LTD., Osaka (JP)

(72) Inventors: Satoshi Abe, Osaka (JP); Isao Fuwa, Osaka (JP); Mikio Mori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 12 days.

(21) Appl. No.: 16/083,362

(22) PCT Filed: Mar. 8, 2017

(86) PCT No.: PCT/JP2017/009190
§ 371 (c)(1),
(2) Date: Sep. 7, 2018

(87) PCT Pub. No.: WO2017/154965
PCT Pub. Date: Sep. 14, 2017

(65) Prior Publication Data
US 2019/0091923 A1    Mar. 28, 2019

(30) Foreign Application Priority Data

Mar. 9, 2016    (JP) .................................. 2016-045893

(51) Int. Cl.
*B29C 64/165* (2017.01)
*B33Y 10/00* (2015.01)
(Continued)

(52) U.S. Cl.
CPC .......... *B29C 64/165* (2017.08); *B22F 3/1055* (2013.01); *B29C 64/135* (2017.08);
(Continued)

(58) Field of Classification Search
CPC .................. B29C 64/40; B29C 64/245; B22F 2003/1058
See application file for complete search history.

(56) References Cited

U.S. PATENT DOCUMENTS

| | | |
|---|---|---|
| 4,863,538 A | 9/1989 | Deckard |
| 8,994,592 B2 | 3/2015 | Scott et al. |

(Continued)

FOREIGN PATENT DOCUMENTS

| | | | |
|---|---|---|---|
| DE | 102009036648 A1 | 2/2010 | |
| EP | 3556490 A1 * | 10/2019 | ............ B22F 3/1055 |

(Continued)

OTHER PUBLICATIONS

Official Communication issued in International Bureau of WIPO Patent Application No. PCT/JP2017/009190, dated May 9, 2017.
(Continued)

*Primary Examiner* — Jacob T Minskey
*Assistant Examiner* — Adrien J Bernard
(74) *Attorney, Agent, or Firm* — Greenblum & Bernstein, P.L.C.

(57) ABSTRACT

There is provided a manufacturing method of a three-dimensional shaped object, the method being capable of reducing a warp deformation of the three-dimensional shaped object. The manufacturing method according to an embodiment of the present invention produces a three-dimensional shaped object by alternate repetition of a powder-layer forming and a solidified-layer forming by light beam irradiation, wherein as a platform for the three-dimensional shaped object, a plate laminate body comprising a dummy solidified layer and a base plate for the shaped object is used, and the dummy solidified layer is formed on one of principal surfaces of the base plate, whereas the three-dimensional shaped object is manufactured on the other of the principal surfaces of the base plate.

4 Claims, 10 Drawing Sheets

(51) Int. Cl.
  *B33Y 30/00*  (2015.01)
  *B29C 64/245*  (2017.01)
  *B29C 64/153*  (2017.01)
  *B22F 3/105*  (2006.01)
  *B29C 64/135*  (2017.01)

(52) U.S. Cl.
  CPC .......... *B29C 64/153* (2017.08); *B29C 64/245* (2017.08); *B33Y 10/00* (2014.12); *B33Y 30/00* (2014.12); *B22F 2003/1056* (2013.01); *B22F 2003/1058* (2013.01)

(56) References Cited

U.S. PATENT DOCUMENTS

| | | | |
|---|---|---|---|
| 10,022,797 | B2 | 7/2018 | Abe et al. |
| 2010/0034983 | A1* | 2/2010 | Fuwa ................... B22F 3/1055 427/557 |
| 2011/0241947 | A1* | 10/2011 | Scott .................. B29C 67/0085 343/700 MS |
| 2012/0308781 | A1* | 12/2012 | Abe ........................ B22F 3/105 428/189 |
| 2015/0054193 | A1 | 2/2015 | Meyer |
| 2017/0203366 | A1 | 7/2017 | Takenami et al. |

FOREIGN PATENT DOCUMENTS

| | | |
|---|---|---|
| GB | 2500412 A | 9/2013 |
| JP | 1-502890 | 10/1989 |
| JP | 2012-506803 | 3/2012 |
| JP | 2012-224906 | 11/2012 |
| WO | 2010/049696 A2 | 5/2010 |
| WO | 2011/102382 | 8/2011 |
| WO | 2016/017155 | 2/2016 |

OTHER PUBLICATIONS

International Preliminary Report on Patentability for PCT/JP2017/009190, dated Sep. 11, 2018, with English language translation.
Extended European Search Report issued in European Application No. EP 17 76 3305, dated Nov. 12, 2018.

* cited by examiner

US 10,821,663 B2

METHOD FOR MANUFACTURING THREE-DIMENSIONAL SHAPED OBJECT

TECHNICAL FIELD

The present invention relates to a method for manufacturing a three-dimensional shaped object. More particularly, the present invention relates to a method for manufacturing a three-dimensional shaped object, in which a formation of a solidified layer is performed by an irradiation of a powder layer with a light beam.

BACKGROUND OF THE INVENTION

Heretofore, a method for manufacturing three-dimensional shaped object by irradiating a powder material with a light beam has been known (such method can be generally referred to as a "selective laser sintering method"). The method can produce the three-dimensional shaped object by an alternate repetition of a powder-layer forming and a solidified-layer forming on the basis of the following (i) and (ii):

(i) forming a solidified layer by irradiating a predetermined portion of a powder layer with a light beam, thereby allowing a sintering of the predetermined portion of the powder of a melting and subsequent solidification of the predetermined portion; and (ii) forming another solidified layer by newly forming a powder layer on the formed solidified layer, followed by similarly irradiating the new powder layer with the light beam.

This kind of the manufacturing technology makes it possible to produce the three-dimensional shaped object with its complicated contour shape in a short period of time. The three-dimensional shaped object can be used as a metal mold in a case where inorganic powder material (e.g., metal powder material) is used as the powder material. While on the other hand, the three-dimensional shaped object can also be used as various kinds of models or replicas in a case where organic powder material (e.g., resin powder material) is used as the powder material.

Taking a case of the selective laser sintering method as an example wherein the metal powder is used as the powder material, and thus the three-dimensional shaped object produced therefrom is used as the metal mold, the selective laser sintering method will now be briefly described. As shown in FIGS. 10A-10C, a squeegee blade 23 is forced to move, and thereby a powder layer 22 with its predetermined thickness is formed on the base plate 21 (see FIG. 10A). Then, a predetermined portion of the powder layer 22 is irradiated with a light beam "L" to form a solidified layer 24 therefrom (see FIG. 10B). Another powder layer 22 is newly provided on the solidified layer 24 thus formed, and is irradiated again with the light beam to form another solidified layer 24. In this way, the powder-layer forming and the solidified-layer forming are alternately repeated, allowing the solidified layers 24 to be stacked with each other (see FIG. 10C). Such alternate repetition of the powder-layer forming and the solidified-layer forming leads to a production of a three-dimensional shaped object with a plurality of the solidified layers 24 integrally stacked therein. The lowermost solidified layer 24 can be provided in a state of adhering to the surface of the base plate 21. Therefore, there can be obtained an integration of the three-dimensional shaped object and the base plate 21. The integrated "three-dimensional shaped object" and "base plate" can be used as the metal mold as they are.

PATENT DOCUMENTS (RELATED ART PATENT DOCUMENTS)

PATENT DOCUMENT 1: Japanese Unexamined Patent Application Publication No. H01-502890

DISCLOSURE OF THE INVENTION

Problems to be Solved by the Invention

In the selective laser sintering method, the irradiated portion of the powder layer with the light beam transforms into the solidified layer 24 through a sintering phenomenon or a melting and subsequent solidification phenomenon. Upon the formation of the solidified layer 24 through such phenomenon, a shrinkage stress occur due to a reduced void between particles of the powder material (FIG. 11A). As a result, the integrated object of the three-dimensional shaped object 100 and the base plate 21 (i.e., a platform for the object 100) becomes susceptible to a warp deformation (FIG. 11B). This will bring concern that a desired shape of the three-dimensional shaped object 100 cannot be provided.

Under these circumstances, the present invention has been created. That is, an object of the present invention is to provide a manufacturing method of a three-dimensional shaped object, the method being capable of reducing a warp deformation of the three-dimensional shaped object.

Means for Solving the Problems

In order to achieve the above object, an embodiment of the present invention provides a method for manufacturing a three-dimensional shaped object by alternate repetition of a powder-layer forming and a solidified-layer forming, the repetition comprising:

(i) forming a solidified layer by irradiating a predetermined portion of a powder layer with a light beam, thereby allowing a sintering of the powder in the predetermined portion or a melting and subsequent solidification of the powder in the predetermined portion; and (ii) forming another solidified layer by newly forming a powder layer on the formed solidified layer, followed by irradiation of a predetermined portion of the newly formed powder layer with the light beam, wherein, as a platform for the three-dimensional shaped object, a plate laminate body comprising a dummy solidified layer and a base plate for the shaped object is used, and the dummy solidified layer is formed on one of principal surfaces of the base plate, whereas the three-dimensional shaped object is manufactured on the other of the principal surfaces of the base plate.

Effect of the Invention

In accordance with the manufacturing method of the present invention, the three-dimensional shaped object can be obtained with its warp deformation being reduced.

BRIEF DESCRIPTION OF THE DRAWINGS

FIGS. 2A-2C are cross-sectional views schematically showing a preparation of a plate laminate body wherein FIG. 2A shows a provision of base plate, FIG. 2B shows a warp deformation, and FIG. 2C shows a flattening process.

FIG. 6A 6E are cross-sectional views schematically showing a manufacturing method of the present invention over time wherein FIG. 6A shows a provision of base plate, FIG. 6E shows a manufacturing of a three-dimensional shaped object.

FIGS. 9A and 9B are cross-sectional views schematically showing a modified size of contour of a dummy solidified layer wherein FIG. 9A shows the contour size of the dummy solidified layer is approximately the same as contour shape of three-dimensional shape object, FIG. 9B shows the contour size of the dummy solidified layer is larger than contour shape of three-dimensional shape object.

FIGS. 10A-10C include cross-sectional views schematically illustrating a laser-sintering/machining hybrid process for a selective laser sintering method wherein FIG. 10A shows a powder-layer forming, FIG. 10B shows a solidified-layer forming, and FIG. 10C shows a stacking of solidified layers.

FIGS. 11A-11B include cross-sectional views schematically illustrating a phenomenon of a warp deformation during a selective laser sintering method wherein FIG. 11A shows a solidified layer with a shrinkage stress occurring therein, and FIG. 11B shows the warp deformation of a three-dimensional shaped object.

MODES FOR CARRYING OUT THE INVENTION

Figure 1:
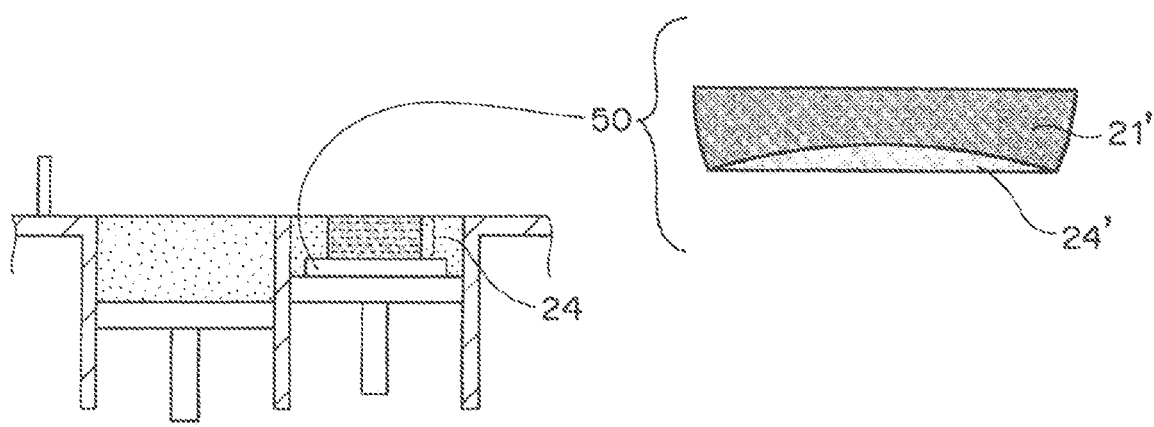
FIG. 1 is a cross-sectional view schematically showing a general concept of the present invention.

The present invention according to an embodiment thereof will be described in more detail with reference to the accompanying drawings. It should be noted that configurations/forms and dimensional proportions in the drawings are merely for illustrative purposes, and thus not the same as those of the actual parts or elements.

The term "powder layer" as used in this description and claims means a "metal powder layer made of a metal powder" or "resin powder layer made of a resin powder", for example. The term "predetermined portion of a powder layer" as used herein substantially means a portion of a three-dimensional shaped object to be manufactured. As such, a powder present in such predetermined portion is irradiated with a light beam, and thereby the powder undergoes a sintering or a melting and subsequent solidification to give a shape of a three-dimensional shaped object. Furthermore, the term "solidified layer" substantially means a "sintered layer" in a case where the powder layer is a metal powder layer, whereas term "solidified layer" substantially means a "cured layer" in a case where the powder layer is a resin powder layer.

The directions of "upper" and "lower", which are directly or indirectly used herein, are ones based on a positional relationship between a plate laminate body and a three-dimensional shaped object at a point in time when the three-dimensional shaped object is manufactured. The side in which the manufactured three-dimensional shaped object is positioned with respect to the plate laminate body is "upper", and the opposite direction thereto is "lower".

Selective Laser Sintering Method

Figure 10A:
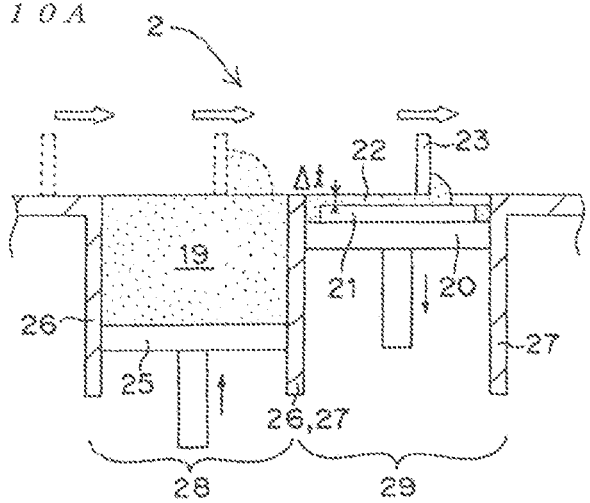
Figure 10B:
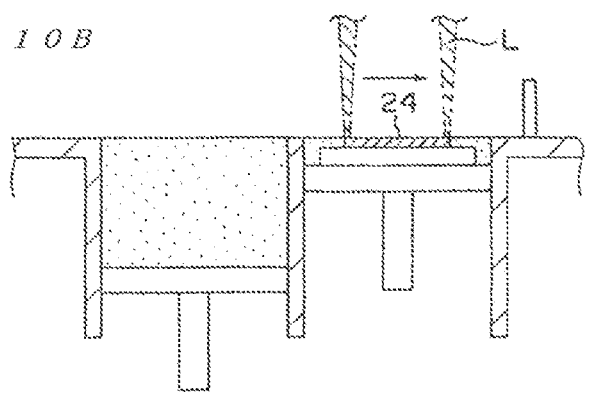
Figure 10C:
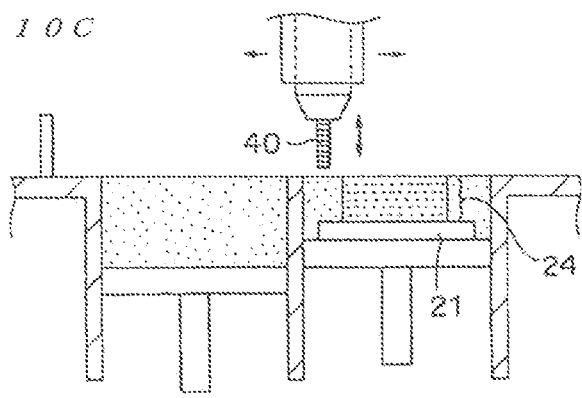
Figure 12:
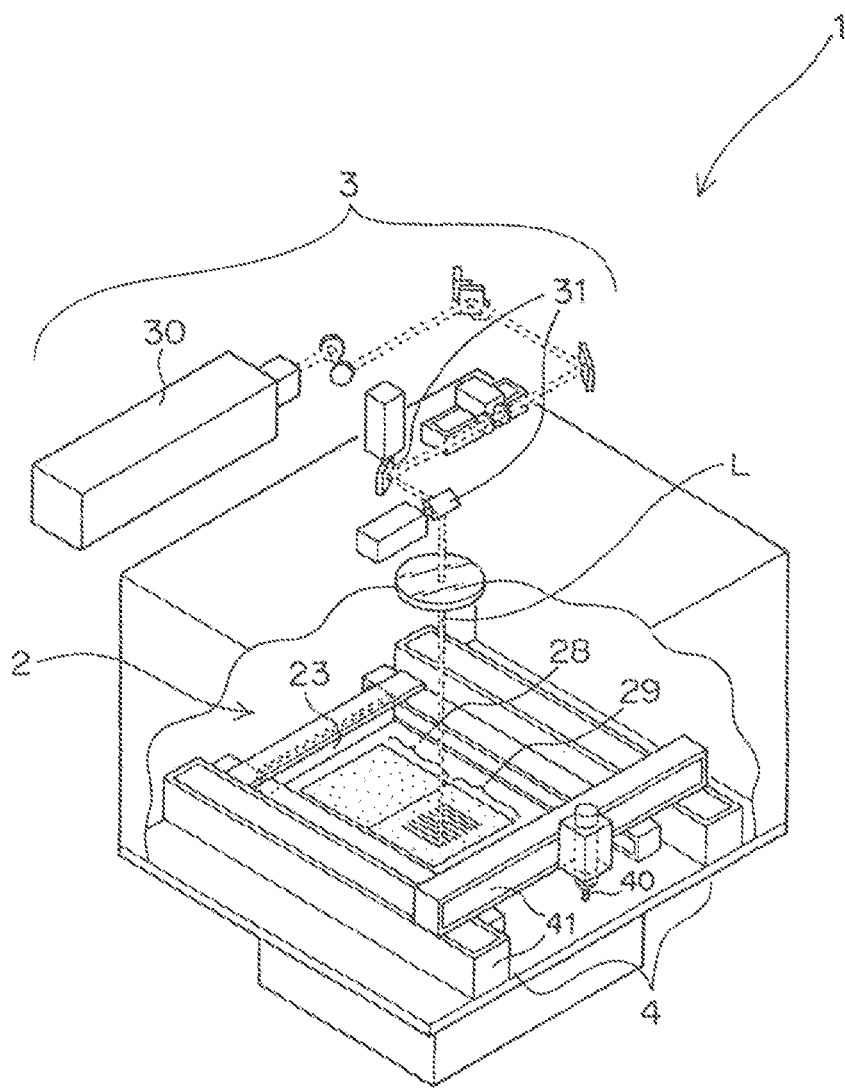
FIG. 12 is a perspective view schematically illustrating a construction of a laser-sintering/machining hybrid machine.
Figure 13:
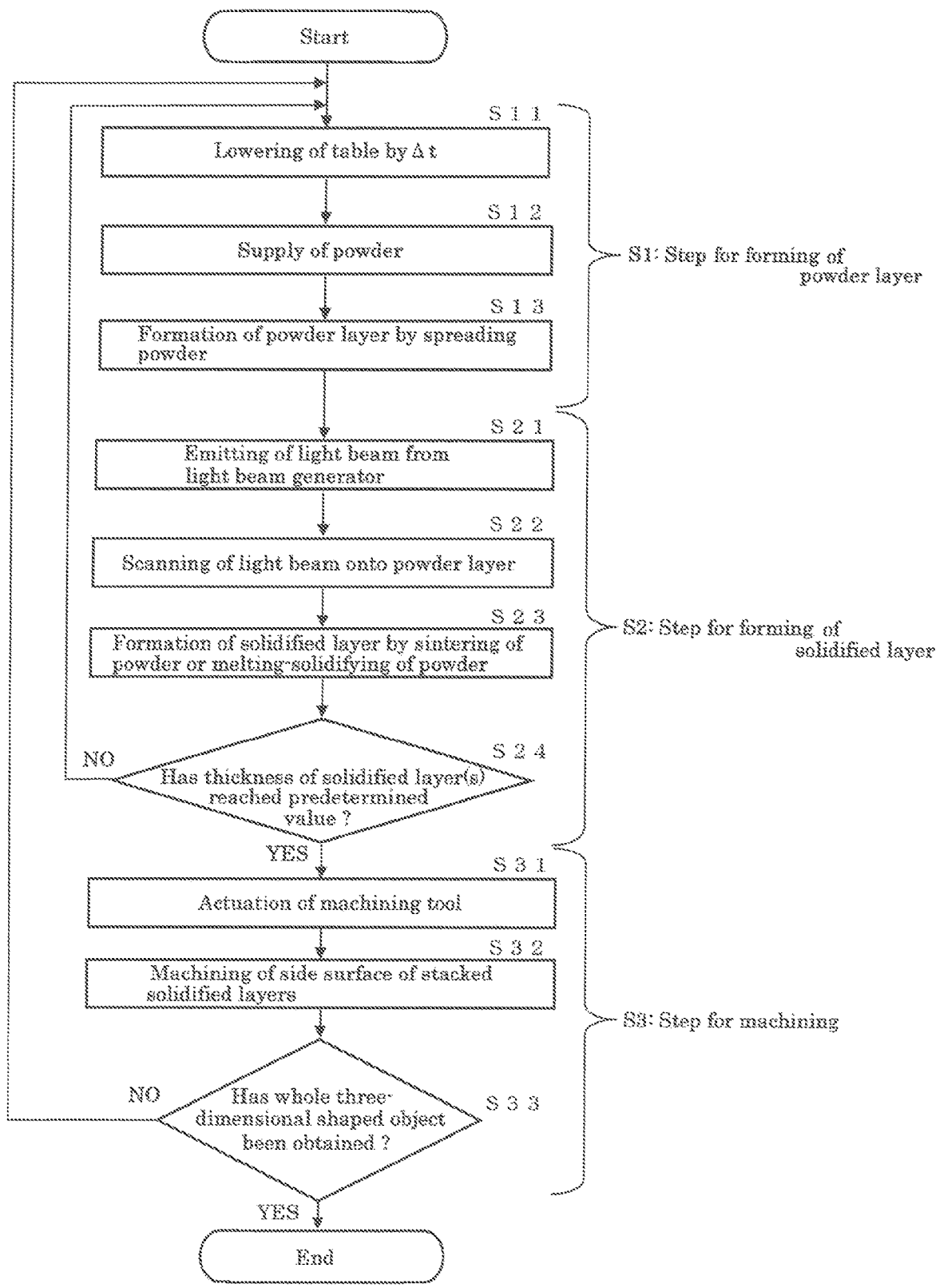
FIG. 13 is a flow chart of general operations of a laser-sintering/machining hybrid machine.

First of all, a selective laser sintering method, on which the manufacturing method of the present invention is based, will be described. By way of example, a laser-sintering/machining hybrid process wherein a machining is additionally carried out in the selective laser sintering method will be especially explained. FIGS. 10A-10C schematically show a process embodiment of the laser-sintering/Machining hybrid. FIGS. 12 and 13 respectively show major constructions and operation flow regarding a laser-sintering/milling hybrid machine for enabling an execution of a machining process as well as the selective laser sintering method.

As shown in FIG. 12, the laser-sintering/milling hybrid machine 1 is provided with a powder layer former 2, a light-beam irradiator 3, and a machining means 4.

The powder layer former 2 is a means for forming a powder layer with its predetermined thickness through a supply of powder (e.g., a metal powder or a resin powder). The light-beam irradiator 3 is a means for irradiating a predetermined portion of the powder layer with a light beam "L". The machining means 4 is a means for milling the side surface of the stacked solidified layers, i.e., the surface of the three-dimensional shaped object.

As shown in FIGS. 10A-10C, the powder layer former 2 is mainly composed of a powder table 25, a squeegee blade 23, a support table 20 and a base plate 21. The powder table 25 is a table capable of vertically elevating/descending in a "storage tank for powder material" 28 whose outer periphery is surrounded with a wall 26. The squeegee blade 23 is a blade capable of horizontally moving to spread a powder 19 from the powder table 25 onto the forming table 20, and thereby forming a powder layer 22. The forming table 20 is a table capable of vertically elevating/descending in a forming tank 29 whose outer periphery is surrounded with a wall 27. The base plate 21 is placed on the forming table 20 and serves as a platform of the three-dimensional shaped object.

As shown in FIG. 12, the light-beam irradiator is mainly composed of a light beam generator 30 and a galvanometer mirror 31. The light beam generator 30 is a device for emitting a light beam "L". The galvanometer mirror 31 is a means for scanning an emitted light beam "L" onto the powder layer 22, i.e., a scan means of the light beam "L".

As shown in FIG. 12, the machining means 4 is mainly composed of an end mill 40 and an actuator 41. The end mill 40 is a cutting tool for milling the side surface of the stacked solidified layers, i.e., the surface of the three-dimensional shaped object. The actuator 41 is a means for driving the end mill 40 to move toward the position to be milled.

Operations of the laser-sintering/milling hybrid machine 1 will now be described in detail. As can be seen from the flowchart of FIG. 73, the operations of the laser-sintering/milling hybrid machine 1 are mainly composed of a powder layer forming step (S1), a solidified layer forming step (S2), and a machining step (S3). The powder layer forming step (S1) is a step for forming the powder layer 22. In the powder layer forming step (S1), first, the support table 20 is descended by Δt (S11), and thereby creating a level difference Δt between an upper surface of the base plate 21 and an upper-edge plane of the forming tank 29. Subsequently, the powder table 25 is elevated by Δt, and then the squeegee blade 23 is driven to move from the storage tank 28 to the forming tank 29 in the horizontal direction, as shown in FIG. 10A. This enables a powder 19 placed on the powder table 25 to be spread onto the base plate 21 (S12), while forming the powder layer 22 (S13). Examples of the powder for the powder layer 22 include a "metal powder having a mean particle diameter of about 5 μm to 100 μm" and a "resin powder having a mean particle diameter of about 30 μm to 100 μm (e.g., a powder of nylon, polypropylene, ABS or the like". Following this step (i.e., the forming step for forming the powder layer 22), the solidified layer forming step (S2) is performed. The solidified layer forming step (S2) is a step for forming a solidified layer 24 through the light beam irradiation. In the solidified layer forming step (S2), a light beam "L" is emitted from the light beam generator 30 (S21). The emitted light beam "L" is scanned onto a predetermined portion of the powder layer 22 by the galvanometer mirror 31 (S22). The scanned light beam can cause the powder in the predetermined portion of the powder layer 22 to be sintered or be melted and subsequently solidified, resulting in a formation of the solidified layer 24 (S23), as shown in FIG. 10B. Examples of the light beam "L" include carbon dioxide gas laser, Nd:YAG laser, fiber laser, ultraviolet light, and the like.

The powder layer forming step (S1) and the solidified layer forming step (S2) are alternately repeated. This allows a plurality of the solidified layers 24 to be integrally stacked with each other, as shown in FIG. 10C.

When the thickness of the stacked solidified layers 24 reaches a predetermined value (S24), the machining step (S3) is initiated. The machining step (S3) is a step for milling the side surface of the stacked solidified layers 24, i.e., the surface of the three-dimensional shaped object. The end mill 40 (see FIG. 10C and FIG. 12) is actuated to initiate an execution of the machining step (S31). For example, in a case where the end mill 40 has an effective milling length of 3 mm, a machining can be performed with a milling depth of 3 mm. Therefore, supposing that "Δt" is 0.05 mm, the end mill 40 is actuated when the formation of the sixty solidified layers 24 is completed. Specifically, the side face of the stacked solidified layers 24 is subjected to the surface machining (S32) through a movement of the end mill 40 driven by the actuator 41. Subsequent to the surface machining step (S3), it is judged whether or not the whole three-dimensional shaped object has been obtained (S33). When a desired three-dimensional shaped object has not yet been obtained, the step returns to the powder layer forming step (S1). Thereafter, the steps S1 through S3 are repeatedly performed again wherein the further stacking of the solidified layer and the further machining process therefor are similarly performed, which eventually leads to a provision of the desired three-dimensional shaped object.

Manufacturing Method of the Present Invention

The present invention is characterized by a platform for the three-dimensional shaped object to be manufactured in the selective laser sintering method.

Specifically, the present invention makes use of a plate laminate body 50 composed of at least two layers as a platform for a three-dimensional shaped object (see FIG. 1).

The use of the plate laminate body 50 can lead to a production of the three-dimensional shaped object with its warp deformation being reduced.

As shown in FIG. 1, the plate laminate body 50 comprises a dummy solidified layer 24' and a base plate 21' for shaped object. The term "plate laminate body" as used herein refers to a platform for a manufacturing of a three-dimensional shaped object, and in particular such term means the platform in a form of plate having a laminar structure.

As can be seen from FIG. 1, the laminar structure of the plate laminate body 50 has such a form that the base plate 21' and the dummy solidified layer 24' are stacked with each other. The base plate 21' corresponds to a conventional base plate 21 (see FIG. 10A), but the base plate 21' is a plate which can have a residual stress in the interior thereof at a point in time before the three-dimensional shaped object is manufactured ("residual stress" herein will be later described in detail). While on the other hand, the dummy solidified layer 24', which is a solidified layer provided on a principal surface of the base plate 21', is particularly a solidified layer provided on the principal surface which is opposite to a principal surface with which the three-dimensional shaped object (i.e., the solidified layer 24 thereof) comes into contact (see FIG. 1). In other words, the dummy solidified layer 24' corresponds to a layer spaced via the base plate 21' with respect to the three-dimensional shaped object to be manufactured.

As such, the term "dummy" of the dummy solidified layer herein substantially refers to a "different" solidified layer which differs from the solidified layers of the three-dimensional shaped object to be manufactured on a platform.

Figure 2A:
Figure 2B:
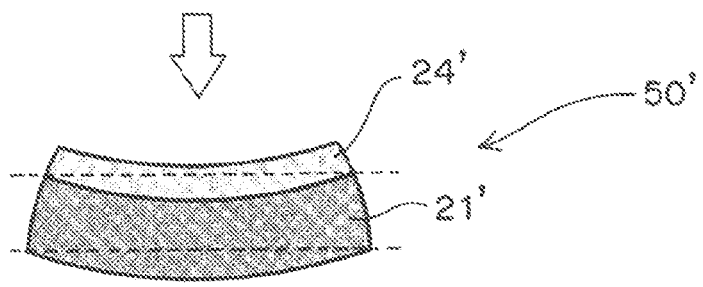
Figure 2C:
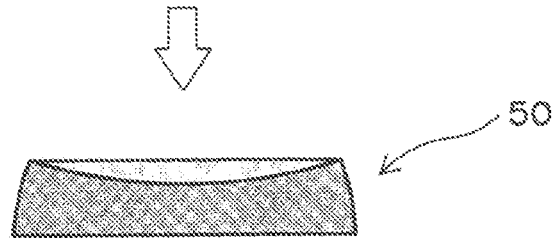

According to the manufacturing method of the present invention, the plate laminate body 50 is a laminate body which has been once warp-deformed. Namely, according to the present invention, a warp deformation has been proactively caused in a precursor of the platform (i.e., plate laminate body) for the three-dimensional shaped object to be manufactured. In particular, it is preferred that the plate laminate body 50 is obtained by subjecting a warp-deformed laminate body 50' to a flattening process, the warp-deformed laminate body 50' being obtained by performing the forming of the dummy solidified layer 24'. See FIG. 2. The plate laminate body 50 thus obtained is preferably provided prior to the manufacturing of the three-dimensional shaped object.

Figure 11A:
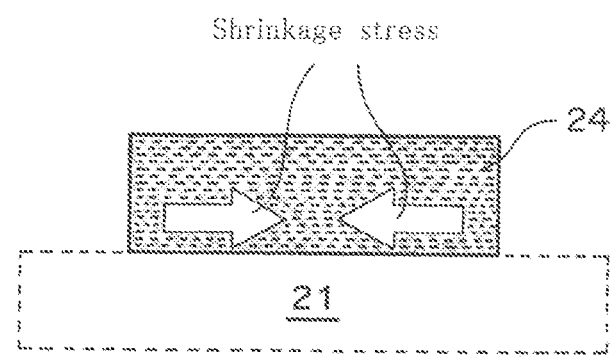
Figure 11B:
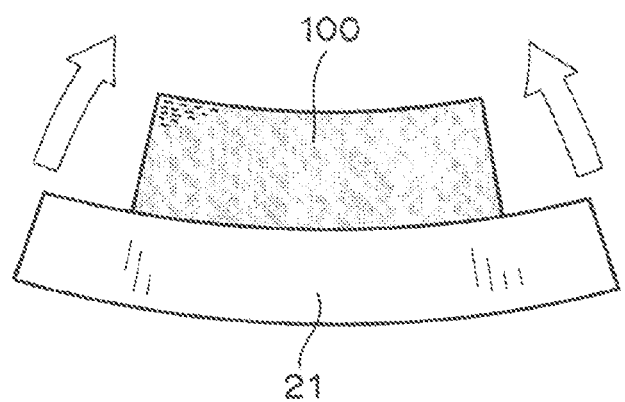

The provision of the plate laminate body 50 will be described more specifically. First, the laminate body 50' is prepared by a forming of the dummy solidified layer 24' on the base plate 21' (see FIGS. 2A and 2B). Similarly to the phenomenon as described with reference to FIGS. 11A and 11B, a warp deformation is caused in the laminate body 50' upon the forming of the dummy solidified layer 24'. Subsequently, the laminate body 50' thus warp-deformed is subjected to a flattening process (see FIGS. 2B and 2C). It is preferred that the flattening process is performed such that the laminate body 50' gets to be a suitable body for the "platform" in particular. The flattening process is a process for rendering a principal surface of the warp-deformed laminate body 50' flat. Through such "warp deformation" and "flattening process", the plate laminate body 50 suitable for use in the present invention can be eventually provided.

In order for the plate laminate body 50 to have a more suitable form of "platform" for the manufacturing of the three-dimensional shaped object, it is preferred that opposed principal surfaces of the warp-deformed laminate body 50' are both subjected to a machining process as the flattening process. More specifically, it is preferred that the machining process is performed with respect to the laminate body 50' by removing a curved portion thereof attributed to the warp deformation, and thereby rendering the both principal surfaces of the body 50' flat. See FIGS. 2B and 2C, for example. Such flattening process makes it possible for the both principal surfaces of the plate laminate body to have a substantially parallel relationship with each other. With the use of such plate laminate body 50, the three-dimensional shaped object can be suitable manufactured on the substantially horizontal plane.

Figure 3:
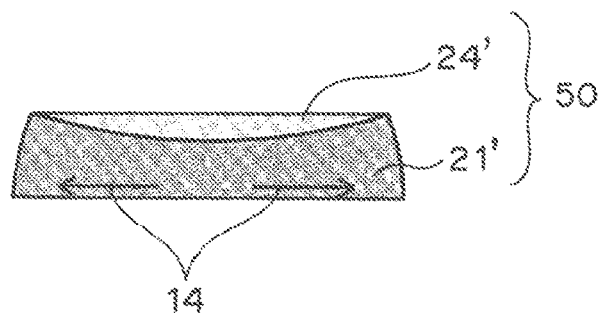
FIG. 3 is a cross-sectional view schematically showing a residual stress of a plate laminate body.

The plate laminate body 50 has a stress remaining in the interior thereof since the body has once underwent the warp deformation. That is, the plate laminate body 50 can have a residual stress in the interior thereof. In particular, an outward stress 14 can remain in the base plate 21' of the plate laminate body 50, as shown in FIG. 3. In this regard, the residual stress of the plate laminate body 50 is utilized upon the manufacturing of the three-dimensional shaped object so as to be against a stress which may be generated in the three-dimensional shaped object, and thereby the warp deformation of the three-dimensional shaped object can be reduced.

Figure 4:
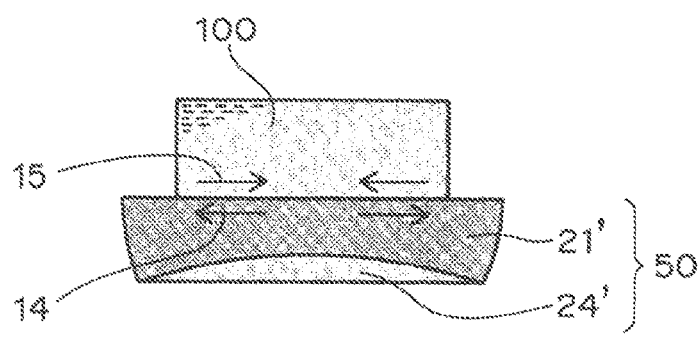
FIG. 4 is a cross-sectional view schematically showing a reduced warp deformation of the shaped object by a plate laminate body.

As shown in FIG. 4, the plate laminate body 50 is preferably placed such that "direction of the residual stress 14 of the plate laminate body 50" and "direction of the stress 15 generated in the three-dimensional shaped object 100" are opposite to each other. The reason for this is that an offset effect between these stresses (14, 15) can be brought about. This means that the placing of the plate laminate body 50 as shown in FIG. 4 allows the stress 15 generated in the three-dimensional shaped object 100 to be mitigated by the residual stress 14 of the plate laminate body 50, which leads to a suitable production of the three-dimensional shaped object 100 with the warp deformation thereof being reduced.

In order to render the directions opposite to each other regarding the "direction of the residual stress 14 of the plate laminate body 50" and the "direction of the stress 15 generated in the three-dimensional shaped object 100", the plate laminate body 50 is preferably placed such that one of the principal surfaces of the plate laminate body 50, which is provided with no dummy solidified layer 24', faces upward. In other words, supposing that a dummy-side principal surface of the base plate 21', on which the formed dummy solidified layer 24' is provided, is regarded as "front principal surface", the placing of the plate laminate body 50 is preferably such that the back principal surface of the base plate 21' faces upward.

Figure 5:
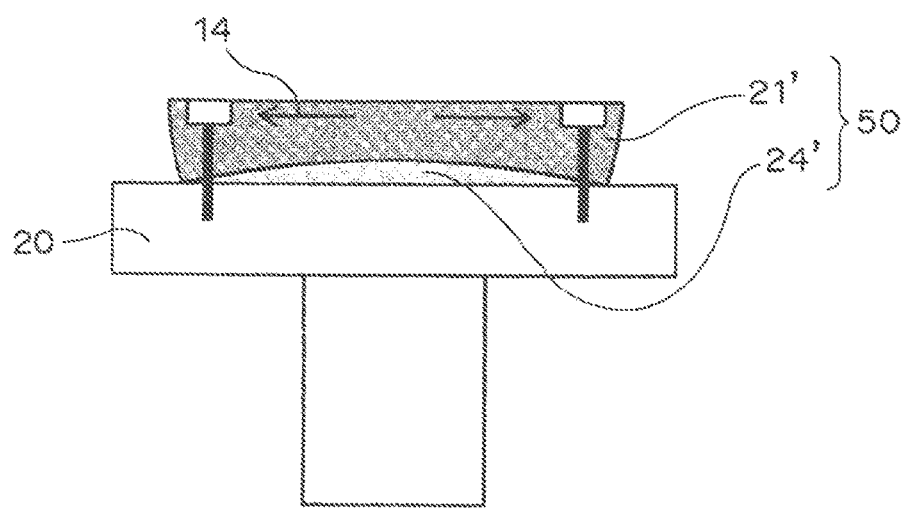
FIG. 5 is a cross-sectional view schematically showing a plate laminate body secured to a support table.

Taking a case as an example wherein the three-dimensional shaped object is manufactured by the laser-sintering/milling hybrid machine 1 (FIG. 10 as well as FIGS. 12 and 13), it is preferred that the plate laminate body 50 is placed onto a support table 20 as shown in FIG. 5. In this case, an upper exposed surface of the plate laminate body 50 placed on the support table 20 corresponds to the above "back principal surface". It is thus preferred that, when the powder-layer forming and the solidified-layer forming are performed on the plate laminate body 50 secured the support table 20, the securing of the plate laminate body 50 with respect to the support table 20 is such that the dummy solidified layer 24' is positioned between the base plate 21' and the support table 20. As shown in FIG. 5, the residual stress 14 in the plate laminate body 50 secured to the support table 20 has a direction of "outward", whereas the stress which can be generated in the three-dimensional shaped object 100 manufactured on such plate laminate body 50 has a direction of "inward". As a result, an offset effect between these stresses can be brought about, which leads to a suitable production of three-dimensional shaped object 100 while the warp deformation thereof is reduced.

Now, the manufacturing method according to one embodiment of the present invention over time will be described below.

(1) Provision of Base Plate

Figure 6A:
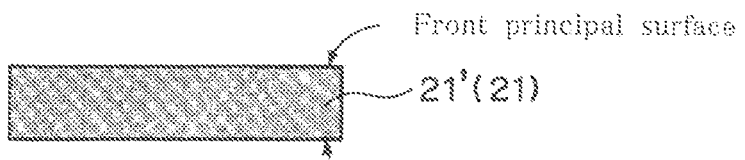

First, the base plate 21' for the shaped object is provided as shown in FIG. 6A. The base plate 21' for the shaped object may be a base plate 21 used conventionally in the selective laser sintering method (see FIG. 10A). For example in a case where a metal powder is used as the powder so form a sintered layer as the solidified layer (i.e., sintered layer made of an iron-based material), the base plate 21' is preferably made of at least one material selected from the group consisting of a steel, a hardmetal (cemented carbide), a high-speed tool steel, an alloy tool steel, a stainless steel, and a carbon steel for machine construction. It is preferred that the base plate 21' typically has a flattened form as a whole because of "plate". The specific form of the base plate 21' is not particularly limited as long as it serves as a platform for the three-dimensional shaped object. Thus, the form of the base plate 21' is not only a cuboid form, but also may be a disc form, a polygonal column form or the like. The principal surface of the base plate 21' is generally required to have a larger size than that of the bottom surface of the three-dimensional shaped object. For example, the principal surface of the base plate 21' has the larger size in 110% to 200% of that of the bottom surface of the shaped object. The thickness of the base plate 21', a base plate dimension along the stacking direction in the manufacturing of the three-dimensional shaped object to be manufactured may be for example in the range of about 10 mm to about 70 mm.

(2) Applying of Warp Deformation

Figure 6B:
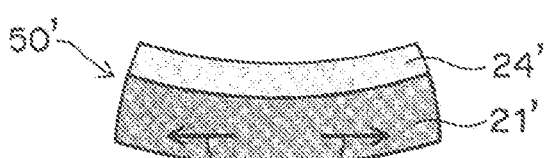
FIG. 6B shows a warp deformation.

The base plate 21' itself subjected to a warp deformation through the forming of the dummy solidified layer 24' (see FIGS. 6A and 6B). Specifically, first, a powder layer is formed on the base plate 21', and then the dummy solidified layer 24' is formed by irradiation of the powder layer with the light beam.

The powder material to be used for the formation of the dummy solidified layer 24' may be the same as the powder material used for the subsequent manufacturing of the three-dimensional shaped object. For example, the metal powder with its mean particle diameter of about 5 μm to 100 μm may be used. By the use of such powder material, a powder layer for the dummy solidified layer 24' can be formed. The resulting powder layer is wholly irradiated with the light beam. This causes a sintering of the powder material or a melting and subsequent, solidification of the powder material, and thereby the dummy solidified layer 24' is formed. The thickness of the dummy solidified layer 24' may be in the range of 0.1 mm to 10 mm for example. In this regard, the dummy solidified layer 24' may be widely formed such that the dummy solidified layer 24' covers the whole principal surface of the base plate 21', as shown in FIG. 6B.

Upon the forming of the dummy solidified layer 24', a shrinkage stress can occur due to a reduced void between particles of the powder material, and thereby causing the dummy solidified layer 24' and the base plate 21' bonded thereto to be warp-deformed. This means that the warp deformation occurs in the laminate body 50' composed of the dummy solidified layer 24' and the base plate 21'. The laminate body 50' has an outward stress 14 that can remain in the base plate 21' due to the warp deformation (see FIG. 6B). In particular, supposing that a dummy-side principal surface of the base plate 21', on which the formed dummy solidified layer 24' is provided, is regarded as "front principal surface", the stress 14, which acts in an outward direction, can remain in the vicinity of the back principal surface of the base plate 21'.

(3) Flattening Process

Figure 6C:
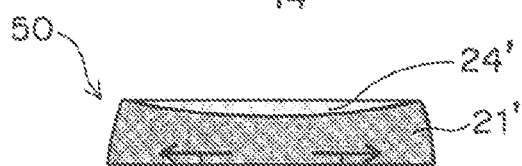
FIG. 6C shows a flattening process.

A flattening process is performed with respect to the warp-deformed laminate body 50' (see FIGS. 6B and 6C). More specifically, a machining process is performed with respect to the laminate body 50' by removing its curved portion attributed to the warp deformation, and thereby providing the flat surface of the laminate body. As can be seen from FIGS. 6B and 6C, it is preferred that the opposed principal surfaces of the laminate body 50' are both subjected to the machining process. This makes it possible for the both principal surfaces of the plate laminate body 50 to be parallel with other, which leads to a suitable provision of the plate laminate body 50 using as the platform for the three-dimensional shaped object.

For the flattening process, a machining means may be used. The machining means may be any suitable one as long as it performs a surface machining treatment. For example, the machining means may be a numerical control (NC: Numerical Control) machine tool or those analogous thereto. Specifically, it is preferred that the machining means is a machining center (MC) whose milling tool (end mill) is automatically exchangeable. As the end mill, for example, a twin bladed ball end mill made of a superhard material is mainly used. A square end mill, a radius end mill or the like may also be used in some cases. In order to improve the flatness of the principal surfaces of the laminate body 50', a flat grinding process may be additionally performed by a surface grinding machine or the like.

(4) Inversion of Plate Lamination Body

The plate laminate body 50 obtained through the above (1) to (3) is subjected to an inversion. That is, the plate laminate body 50, which is one obtained by the flattening process of the warp-deformed body, is flipped so that the upper and lower principal surfaces of the plate laminate body are inverted with each other (see FIGS. 6C and 6D). More specifically, the plate laminate body 50 with the dummy solidified layer 24' being positioned on the upper side, whereas the base plate 21' being positioned on the lower side is flipped such that the inversion thereof is given. Supposing that a dummy-side principal surface of the base plate 21', on which the formed dummy solidified layer 24' is provided, is regarded as "front principal surface", the inversion of the plate laminate body 50 is performed such that the back principal surface of the base plate 21' gets to face upward.

Figure 6D:
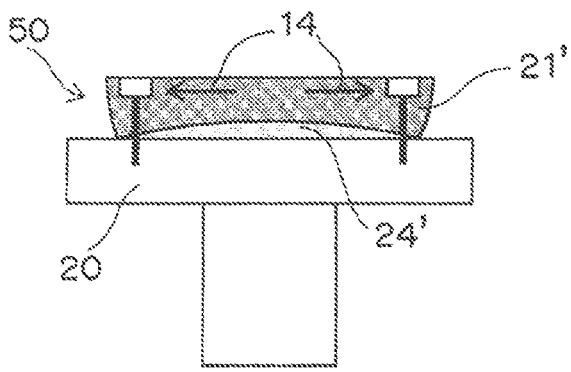
FIG. 6D shows a securing with respect to a support table.
Figure 6E:
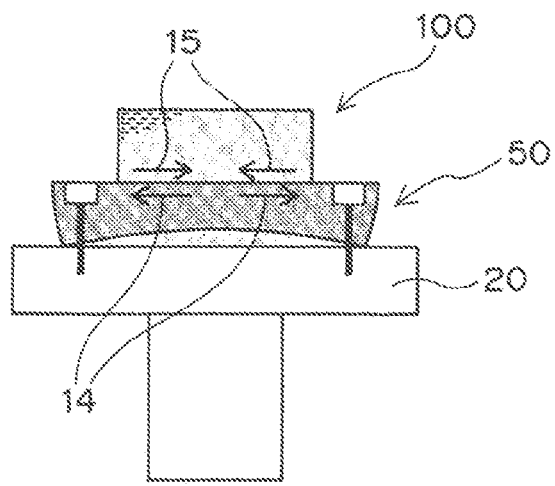

As shown in FIG. 6D, it is preferred that, through the inversion of the plate laminate body, the plate laminate body 50 is secured with respect to the support table 20 such that the dummy solidified layer 24' is positioned between the base plate 21' and the support table 20. This allows the residual stress 14 in the plate laminate body 50 secured to the support table 20 to have a direction of "outward", whereas the stress which can be generated in the three-dimensional shaped object 100 to be manufactured on the plate laminate body 50 has a direction of "inward" (see FIG. 6E). As a result, the residual stress 14 of the plate laminate body 50 can suitably act against the inward stress 15 such that the offset effect between these stresses can be given at a point in time during the three-dimensional shaped object 100 is manufactured.

(5) Manufacturing of Three-Dimensional Shaped Object

After the securing of the plate laminate body 50, the manufacturing of the three-dimensional shaped object 100 is initiated using the secured plate laminate body 50 as the platform for the shaped, object. As can be seen from FIGS. 6C and 6E, the three-dimensional shaped object 100 is manufactured on the "back principal surface" of the base plate 21' of the plate laminate body 50.

The direction of the stress 15 that can be generated in the three-dimensional shaped object 100 to be manufactured on the plate laminate body 50 is "inward". While on the other hand, the direction of the residual stress 14 in the plate laminate body 50 is "outward" due to the warp deformation of the body. That is, the stress 15 generated upon the manufacturing of the three-dimensional shaped object 100 and the residual stress 14 of the plate laminate body 50 have the opposite directions to each other. This enables the stress 15 generated upon the manufacturing of the three-dimensional shaped object 100 to be mitigated by the residual stress 14 of the plate laminate body 50, which leads to a reduction in the warp deformation of the three-dimensional shaped object 100.

Figure 7:
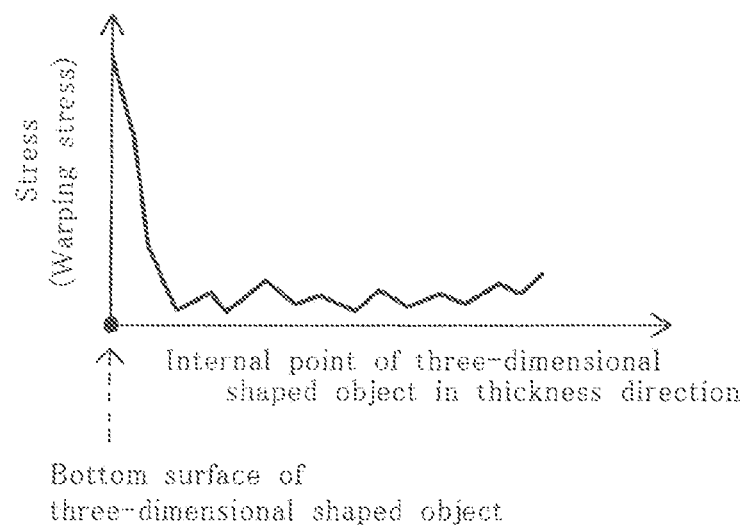
FIG. 7 is a graph showing a stress that can occur in a three-dimensional shaped object.

The inventors of the present application have found that the stress 15 generated during the manufacturing of the three-dimensional shaped object 100 is larger at an earlier stage of the manufacturing (see FIG. 7). More specifically, as can be seen from FIG. 7, the large stress occurs especially at the bottom surface of the three-dimensional shaped object 100. This means that there is a large stress generated especially at a boundary region between the three-dimensional shaped object 100 and the platform therefor.

In this regard, the use of the plate laminate body 50 as the platform according to the manufacturing method of the present invention can effectively affect the stress generated in the three-dimensional shaped object at the earlier stage of the manufacturing thereof More specifically, although the larger stress occurs especially at the bottom surface of the three-dimensional shaped object, such bottom surface is provided with the plate laminate body 50, which can effectively reduce the stress 15 of the three-dimensional shaped object by the residual stress 14 of the plate laminate body 50 (see FIG. 4).

While several embodiments of the present invention have been hereinbefore described as a typical example, various specific other embodiments can also be possible.

Blast Machining

The manufacturing method of the present invention makes use of the residual stress of the plate laminate body to act against the stress that can be generated in the three-dimensional shaped object. It is, however, conceivable that there may be such a plate laminate body that the residual stress thereof is smaller than the stress of the three-dimensional shaped object.

Figure 8:
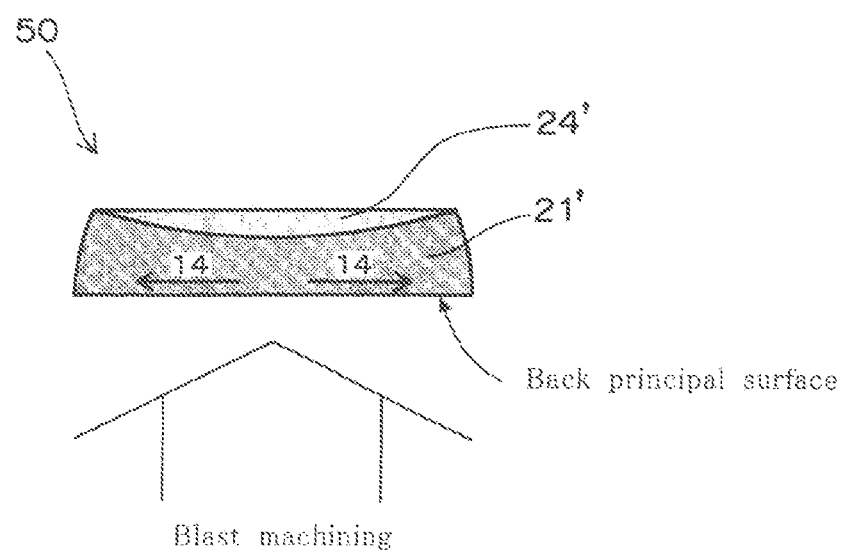
FIG. 8 is a cross-sectional view schematically showing an embodiment of a blast machining.

In this case, it is preferred that the plate laminate body is subjected to a blast machining. Specifically, it is preferred that the blast machining is additionally performed with respect to the "back principal surface" of the base plate 21' of the plate laminate body 50 obtained after the flattening process (see FIG. 8).

The blast machining of the plate laminate body 50 can provide such an effect that the outward stress 14 is increased in the laminate body 50. That is, the stress 14 for acting against the stress of the three-dimensional shaped object becomes larger. This means that the residual stress 14 of the plate laminate body 50 can be suitably adjusted by the blast machining, which leads to a more effective reduction in the warp deformation of the three-dimensional shaped object.

With respect to the blast machining, it can also increase a surface roughness of the plate laminate body. The increased surface roughness leads to an increase in a contact area between the plate laminate body and the three-dimensional shaped object manufactured thereon. Thus, the blast machining of the plate laminate body can improve a bonding strength between the plate laminate body and the three-dimensional shaped object. This can provide such an effect that a structure strength is increased in the integration of the plate laminate body and the three-dimensional shaped object.

Modified Size of Contour of Dummy Solidified Layer

Figure 9A:
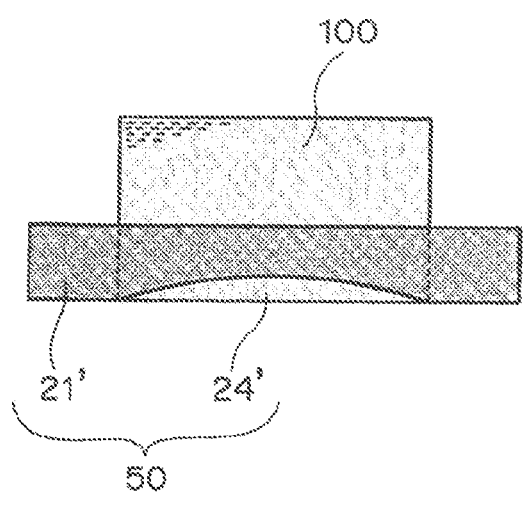

When the plate laminate body is prepared, the dummy solidified layer may be formed on only a part of the principal surface of the base plate. For example, as shown in FIG. 9A, the dummy solidified layer 24' is formed such that the contour shape of the dummy solidified layer 24' is approximately the same as the contour shape of the bottom surface of the three-dimensional shaped object 100 to be manufactured. This can keep the time required for the formation of the dummy solidified layer 24' to the minimum, while giving the residual stress in the plate laminate body 50. Consequently, the light beam required for the formation of the dummy solidified layer 24' can be reduced, which leads to a more effective manufacturing of the three-dimensional shaped object 100.

Figure 9B:
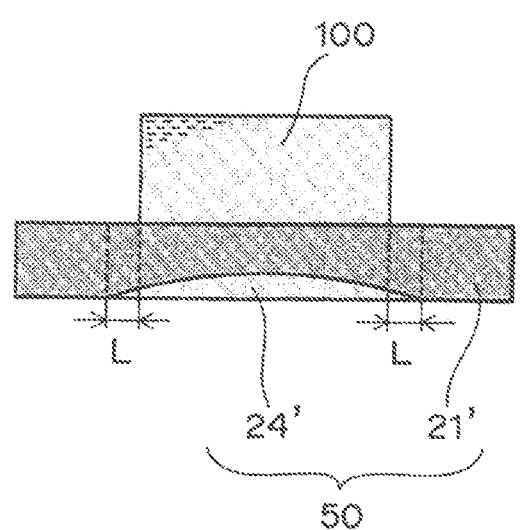

In a case where the residual stress required for the plate laminate body 50 is insufficient in the embodiment of FIG. 9A, then the contour shape of the dummy solidified layer 24' may be made larger than the contour shape of the bottom surface of the three-dimensional shaped object 100 to be manufactured (see FIG. 9B). The reason for this is that the larger the size of the dummy solidified layer 24' becomes, the greater the residual stress 14 of the plate laminate body 50 becomes. By way of example, the dummy solidified layer 24' may be formed such that the contour shape of the dummy solidified layer 24 is larger by about 0.5 mm to about 10 mm than the contour shape of the bottom surface of the three-dimensional shaped object 100 to be manufactured. More specifically, the forming of the solidified 24' is performed such that the dimension of "L" shown in FIG. 9B is in the range of about 0.5 mm to about 10 mm.

Although some embodiments of the present invention have been hereinbefore described, these are regarded merely as typical ones, and thus the present invention is not limited to such embodiments. It will be readily appreciated by those skilled in the art that various modified embodiments are possible without departing from the scope of the present invention.

It should be noted that the present invention as described above includes the following suitable aspects:

The first aspect: A method for manufacturing a three-dimensional shaped object by alternate repetition of a powder-layer forming and a solidified-layer forming, the repetition comprising:

(i) forming a solidified layer by irradiating a predetermined portion of a powder layer with a light beam, thereby allowing a sintering of the powder in the predetermined portion or a melting and subsequent solidification of the powder in the predetermined portion; and (ii) forming another solidified layer by newly forming a powder layer on the formed solidified layer, followed by irradiation of a predetermined portion of the newly formed powder layer with the light beam, wherein, as a platform for the three-dimensional shaped object, a plate laminate body comprising a dummy solidified layer and a base plate for the shaped object is used, and the plate laminate body is such that the dummy solidified layer is formed on one of principal surfaces of the base plate, whereas the three-dimensional shaped object is manufactured on the other of the principal surfaces of the base plate.

The second aspect: The method according to the first aspect, wherein the plate laminate body is obtained by subjecting a warp-deformed laminate body to a flattening process, the warp-deformed laminate body being obtained by performing the forming of the dummy solidified layer.

The third aspect: The method according to the second aspect, wherein, as the flattening process, opposed principal surfaces of the warp-deformed laminate body are both subjected to a machining process.

The fourth aspect: The method according to the second or third aspect, wherein the plate laminate body is subjected to a blast machining.

The fifth aspect: The method according to any one of the first to fourth aspects, wherein the powder-layer forming and the solidified-layer forming are performed on the plate laminate body secured to a support table, and the securing of the plate laminate body with respect to the support table is such that the dummy solidified layer is positioned between the base plate and the support table.

INDUSTRIAL APPLICABILITY

The manufacturing method according to an embodiment of the present invention can provide various kinds of articles. For example, in a case where the powder layer is a metal powder layer (i.e., inorganic powder layer) and thus the solidified layer corresponds to a sintered layer, the three-dimensional shaped object obtained by the present invention can be used as a metal mold for a plastic injection molding, a press molding, a die casting, a casting or a forging. While on the other hand in a case where the powder layer is a resin powder layer (i.e., organic powder layer) and thus the solidified layer corresponds to a cured layer, the three-dimensional shaped object obtained by the present invention can be used as a resin molded article.

CROSS REFERENCE TO RELATED PATENT APPLICATION

The present application claims the right of priority of Japanese Patent Application No. 2016-045893 (filed on Mar. 9, 2016, the title of the invention: "METHOD FOR MANUFACTURING THREE-DIMENSIONAL SHAPED OBJECT"), the disclosure of which is incorporated herein by reference.

EXPLANATION OF REFERENCE NUMERALS

50 Plate laminate body
21' Base plate
24' Dummy solidified layer
100 Three-dimensional shared object
20 Support table

The invention claimed is:

1. A method for manufacturing a three-dimensional shaped object by alternate repetition of a powder-layer forming and a solidified-layer forming, the repetition comprising:
   (i) forming a solidified layer by irradiating a predetermined portion of a powder layer with a light beam, thereby allowing a sintering of the powder in the predetermined portion or a melting and subsequent solidification of the powder; and
   (ii) forming another solidified layer by newly forming a powder layer on the formed solidified layer, followed by irradiation of a predetermined portion of the newly formed powder layer with the light beam,
   wherein, as a platform for the three-dimensional shaped object, a plate laminate body comprising a dummy solidified layer and a base plate for the shaped object is used,
   wherein the plate laminate body is such that the dummy solidified layer is formed on one of principal surfaces of the base plate, whereas the three-dimensional shaped object is manufactured on the other of the principal surfaces of the base plate,
   wherein the plate laminate body is obtained by subjecting a warp-deformed laminate body to a flattening process, the warp-deformed laminate body being obtained by performing the forming of the dummy solidified layer,
   wherein the plate laminate body is secured with respect to a support table in a manner such that the dummy solidified layer is positioned between the base plate and the support table,
   wherein a direction of a residual stress in the plate laminate body with the dummy solidified layer formed therein is outward due to warp deformation of the plate laminate body, whereas a direction of a stress generated in the three-dimensional shaped object to be manufactured on the plate laminate body is inward, and
   wherein a curved portion of the warp-deformed laminate body is removed by the flattening process, and thereby rendering both principal surfaces of the warp-deformed laminate body flat.

2. The method according to claim 1, wherein, as the flattening process, opposed principal surfaces of the warp-deformed laminate body are both subjected to a machining process.

3. The method according to claim 1, wherein the plate laminate body is subjected to a blast machining.

4. The method according to claim 1, wherein the powder-layer forming and the solidified-layer forming are performed using the plate laminate body secured to the support table.

* * * * *